(12) United States Patent
Kim et al.

(10) Patent No.: US 10,969,597 B2
(45) Date of Patent: Apr. 6, 2021

(54) DISPLAY PANEL INSPECTION EQUIPMENT

(71) Applicant: Samsung Display Co., Ltd., Yongin-si (KR)

(72) Inventors: Soo Young Kim, Seoul (KR); Kyu Seok Kim, Asan-si (KR); Hyo Jin An, Cheonan-si (KR); Young Nam Yun, Suwon-si (KR); Go Eun Lee, Cheonan-si (KR); Min Tak Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/533,564

(22) Filed: Aug. 6, 2019

(65) Prior Publication Data
US 2020/0050007 A1  Feb. 13, 2020

(30) Foreign Application Priority Data

Aug. 10, 2018 (KR) .................. 10-2018-0093815

(51) Int. Cl.
G02B 27/12 (2006.01)
G02B 27/10 (2006.01)
G09G 3/00 (2006.01)
G02B 5/20 (2006.01)

(52) U.S. Cl.
CPC .......... G02B 27/126 (2013.01); G02B 5/201 (2013.01); G02B 27/1013 (2013.01); G09G 3/006 (2013.01); G09G 2320/0626 (2013.01)

(58) Field of Classification Search
CPC .. G02B 27/126; G02B 5/201; G02B 27/1013; G09G 3/006; G09G 2320/0626; G01M 11/00; G02F 1/1309
See application file for complete search history.

(56) References Cited

U.S. PATENT DOCUMENTS

| 8,704,895 | B2 * | 4/2014 | Safaee-Rad ............. G01J 3/506 348/189 |
| 8,988,564 | B2 * | 3/2015 | Webster ............. G02B 27/1013 348/265 |
| 9,465,221 | B2 * | 10/2016 | Webster ............... G02B 27/149 |
| 9,706,132 | B2 | 7/2017 | Nisenzon et al. |
| 10,228,283 | B2 * | 3/2019 | Nath ...................... G01J 3/0208 |
| 2007/0070254 | A1 * | 3/2007 | Cazier .................... H04N 17/00 348/723 |

(Continued)

FOREIGN PATENT DOCUMENTS

JP  2017-21356 A  1/2017
KR  10-1612204 B1  4/2016

*Primary Examiner* — Boubacar Abdou Tchoussou
(74) *Attorney, Agent, or Firm* — Lewis Roca Rothgerber Christie LLP

(57) ABSTRACT

A display panel inspection equipment includes: a panel support on which a display panel is supported; and an imaging device which faces the panel support, wherein the imaging device has an optical path and includes: a lens unit which is provided on a side of the optical path and causes light to enter the imaging device; a sensing unit which is provided on the other side of the optical path and includes a Bayer filter; and a light splitting unit which overlaps at least a part of the optical path, is provided between the lens unit and the sensing unit, and splits the light entering the imaging device into a plurality of beams.

11 Claims, 12 Drawing Sheets

(56) References Cited

U.S. PATENT DOCUMENTS

| | | | |
|---|---|---|---|
| 2012/0189293 A1* | 7/2012 | Cao | H04N 5/2258 396/333 |
| 2013/0050504 A1* | 2/2013 | Safaee-Rad | G09G 5/02 348/181 |
| 2013/0063629 A1* | 3/2013 | Webster | H04N 5/2253 348/265 |
| 2015/0177524 A1* | 6/2015 | Webster | G02B 27/1013 348/360 |
| 2018/0045569 A1* | 2/2018 | Nath | G01J 3/0208 |

* cited by examiner

DISPLAY PANEL INSPECTION EQUIPMENT

CROSS-REFERENCE TO RELATED APPLICATION

This application claims priority to and the benefit of Korean Patent Application No. 10-2018-0093815, filed on Aug. 10, 2018, in the Korean Intellectual Property Office, the disclosure of which is incorporated herein by reference in its entirety.

BACKGROUND

1. Field

The present disclosure relates to display panel inspection equipment, and more particularly, to display panel inspection equipment which measures and inspects chromaticity and luminance of a display panel.

2. Description of the Related Art

In the manufacturing process of a display device, various inspection processes for inspecting whether a display panel is defective are performed. In order to check whether a display panel is defective, visual inspection has been carried out by an inspector with naked eye. Recently, inspection is carried out by an automated inspection system utilizing a colorimeter.

An automated inspection system utilizing a colorimeter is utilized to measure chromaticity and luminance. Such an inspection system is capable of quantitatively evaluating display defects, increasing test speed, and uniformly and accurately evaluating the entire display device.

SUMMARY

Aspects of the present disclosure are directed toward display panel inspection equipment which can reduce measurement time and generation of noise by splitting light emitted from a display panel according to a wavelength band and adjusting the amount of the split light.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

According to an embodiment of the present disclosure, a display panel inspection equipment includes: a panel support configured to support a display panel; and an imaging device facing the panel support, wherein the imaging device has an optical path and includes: a lens unit on a side of the optical path and configured to cause light to enter the imaging device; a sensing unit on an other side of the optical path and including a Bayer filter; and a light splitting unit between the lens unit and the sensing unit, overlapping at least a part of the optical path, and configured to split the light entering the imaging device into a plurality of beams.

According to another embodiment of the present disclosure, a display panel inspection equipment includes: a panel support configured to support a display panel; and an imaging device facing the panel support, wherein the imaging device includes: a lens unit configured to receive a first light emitted from the display panel and transmit a second light into the imaging device; a light splitting unit configured to receive the second light and split the second light into a third light according to a wavelength band, wherein the third light includes a beam of a first color, a beam of a second color and a beam of a third color; a light amount adjusting unit configured to receive the third light and transmit a fourth light by adjusting an amount of the third light such that an amount light of the beam of the first color is the largest; and a sensing unit configured to receive the fourth light and including a Bayer filter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
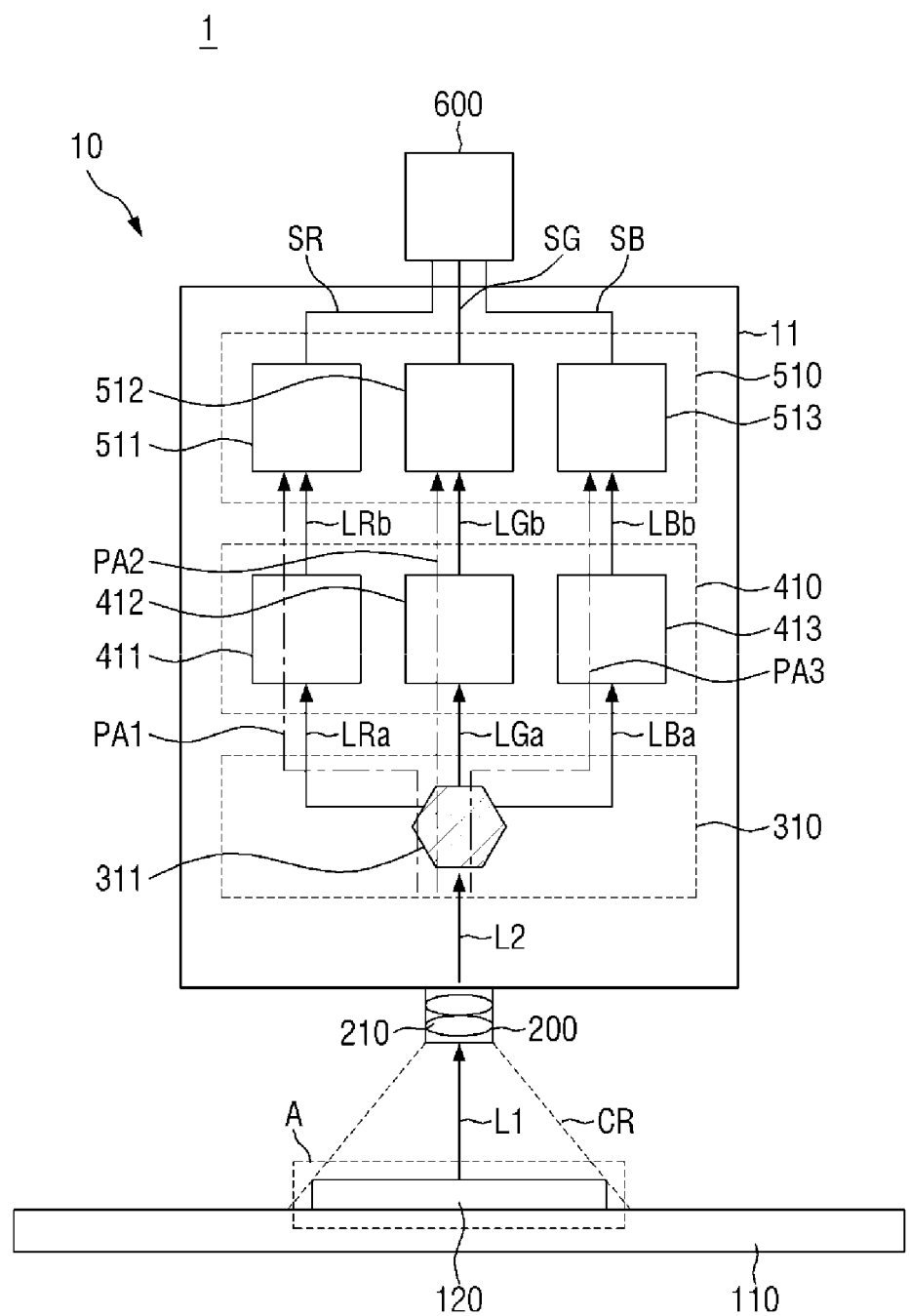
FIG. 1 is a schematic view of display panel inspection equipment according to an embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims, and equivalents thereof.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms "first," "second," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In the drawings, components may be exaggerated or reduced in size for convenience of explanation.

Throughout the specification, like reference numerals refer to like elements.

Hereinafter, embodiments will be described with reference to the accompanying drawings.

Figure 2:
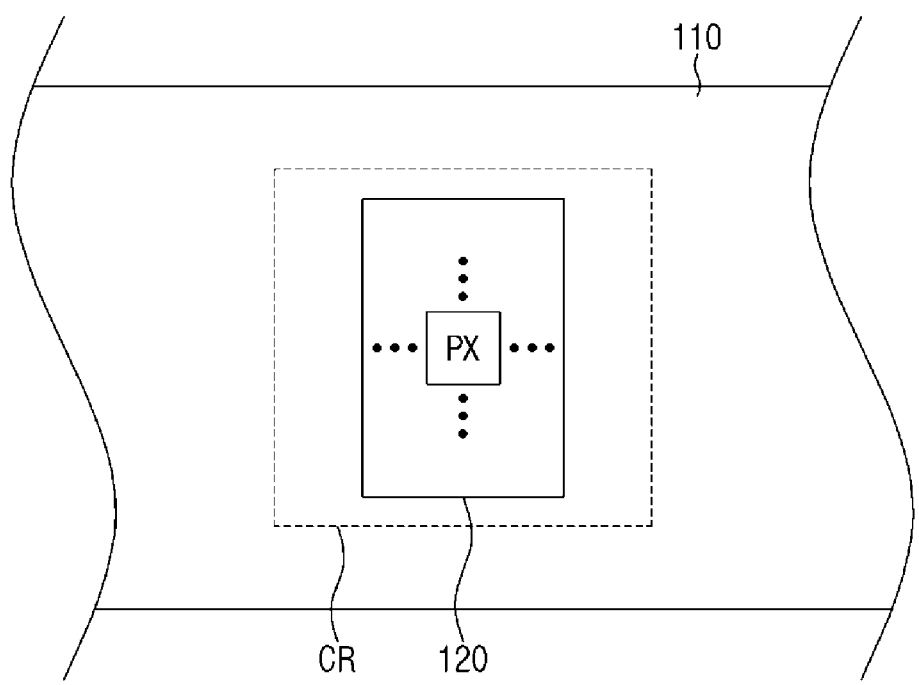
FIG. 2 is a schematic plan view of a region "A" of FIG. 1.

FIG. 1 is a schematic view of display panel inspection equipment 1 according to an embodiment. FIG. 2 is a schematic plan view of the region "A" of FIG. 1. The basic configuration of the display panel inspection equipment 1 will now be described with reference to FIGS. 1 and 2.

Referring to FIG. 1, the display panel inspection equipment 1 may include a panel support (e.g., a support panel) 110 and an imaging device 10 (e.g., an imager). The imaging device 10 may be placed to face the panel support 110. A display panel 120 may be placed on the panel support 110. The display panel 120, which is an object to be inspected, may be placed between the panel support 110 and the imaging device 10. The display panel inspection equipment 1 may take a photograph of the display panel 120 placed on the panel support 110 utilizing the imaging device 10. The display panel inspection equipment 1 may take a photograph of the display panel 120 within a photographing range CR.

The panel support 110, the display panel 120, and the imaging device 10 may be arranged to overlap each other in a vertical direction. However, the present disclosure is not limited to this case, and the arrangement relationship of the panel support 110, the display panel 120 and the imaging device 10 can be suitably changed variously as long as the imaging device 10 can take a photograph of the display panel 120.

One display panel 120 may be placed on the panel support 110 as illustrated in the drawings. However, the present disclosure is not limited to this case, and a plurality of display panels 120 can be placed on the panel support 110. When a plurality of display panels 120 are placed, they may be arranged and fixed on the panel support 110. One or a plurality of display panels 120 may be placed on the panel support 110 by a robot arm or a conveyor along a set or predetermined path. A case where one display panel 120 is placed on the panel support 110 will be described below as an example.

The display panel 120 may be placed between the panel support 110 and the imaging device 10. The display panel 120 is an object to be inspected and may be a display panel of various display devices, such as a liquid crystal display, an organic light emitting display, a plasma display, and an electrophoretic display. A case where an organic light emitting display panel is inspected will be described below as an example. The display panel 120 may include a plurality of pixels PX, and each of the pixels PX may emit red light, green light, blue light, or a mixture of red light, green light and blue light.

The display panel 120 placed on the panel support 110 may be driven by external power and signals. The entire surface of the driven display panel 120 may concurrently or simultaneously emit light. The display panel 120 may be a surface light source whose surface emits light. The light emitted from the display panel 120 may be adjusted by the external power and signals. The light emitted from the display panel 120 may include light of various suitable colors. A case where the emitted light is white light containing all of red light, green light, and blue light will be described below as an example. The display panel 120 may emit light L1 toward the imaging device 10, and the emitted light L1 may enter the imaging device 10 through a lens unit (e.g., an optic) 200.

The imaging device 10 may include a case 11, the lens unit 200, a light splitting unit (e.g., a light splitter) 310, a light amount adjusting unit (e.g., a light amount adjustor) 410, a sensing unit (e.g., a light sensor) 510, and a signal processing unit (e.g., a signal processor) 600.

The case 11 may be a space in which each element of the imaging device 10 is disposed. Inside the case 11, optical paths (PA1, PA2 and PA3) along which light L2 incident into the imaging device 10 travels may be formed. In FIG. 1, light emitted from the display panel 120 enters the imaging device 10 through the lens unit 200 and travels to the light splitting unit 310, the light amount adjusting unit 410 and the sensing unit 510 in the form of L2, LRa, LGa, LBa, LRb, LGb, and LBb. The light beams L2, LRa, LGa, LBa, LRb, LGb and LBb may travel while forming their respective optical paths along which they move.

The optical paths may include a first optical path PA1, a second optical path PA2, and a third optical path PA3. The first optical path PA1 may include a first beam LRa and a first adjusted beam LRb. The second optical path PA2 may include a second beam LGa and a second adjusted bream LGb. The third optical path PA3 may include a third beam LBa and a third adjusted beam LBb.

The lengths of the first through third optical paths PA1 through PA3 along which the light L1 emitted from the display panel 120 travels to the sensing unit 510 may be equal (i.e., the same) regardless of the wavelength and intensity of light traveling along each of the first through third optical paths PA1 through PA3. However, the lengths of the first through third optical paths PA1 through PA3 may also be different from each other depending on the arrangement structure of the light splitting unit 310, the light amount adjusting unit 410 and the sensing unit 510 and a display panel inspection method. That is, optical paths formed inside the case 11 are not limited to the above example, and various suitable (e.g., various more types of) optical paths can be formed as needed. Although not illustrated in the drawings, the imaging device 10 may further include an element (for example, a reflector) for forming an optical path along which the light L2 incident into the imaging device 10 reaches the sensing unit 510.

The lens unit 200 may be disposed on an outermost side of the imaging device 10. The lens unit 200 may be placed to face the display panel 120. Light emitted from the display panel 120 may enter the imaging device 10 through the lens unit 200. The lens unit 200 may include a lens module 210. Although the lens module 210 including two lenses is schematically illustrated in FIG. 1, the lens module 210 may include (e.g., may be composed of) two or more lenses including an objective lens and an attachment lens. The lens module 210 including (e.g., composed of) a plurality of lenses may be provided as a combination of the lenses arranged successively on the path of light. Accordingly, the lens module 210 can input light emitted from the display panel 120, which is to be inspected, to an optical path by condensing (e.g., concentrating or focusing) the light. Because a plurality of lenses are combined with each other in the lens module 210, the lens module 210 can be configured such that spherical aberration, coma aberration, and/or chromatic aberration can be sufficiently corrected. The objective lens utilized in the lens module 210 may be, but is not limited to, of a Fraunhofer type (e.g., a Fraunhofer lens), a Gauss type (e.g., a Gauss lens), and/or a Taylor type (e.g., a Taylor lens).

In FIG. 2, the display panel 120 is placed on the panel support 110 and within the photographing range CR. The photographing range CR may be larger (e.g., wider) than the display panel 120 placed on the panel support 110. However, the photographing range CR can also be formed inside the display panel 120 as needed. That is, the photographing range CR can be adjusted according to various conditions such as the size and number of the display panels 120. The photographing range CR may be adjusted by the lens unit 200. The photographing range CR may be adjusted according to the shape and configuration of the lens module 210 inside the lens unit 200. For example, when the lens unit 200 includes a wide-angle lens having a wide angle of view, the photographing range CR may be increased. When the lens unit 200 includes a telephoto lens having a narrow angle of view, the photographing range CR may be reduced. In addition, the photographing range CR may be adjusted by moving the panel support 110 up, down, left, and right.

The light L1 emitted from the display panel 120 may enter the imaging device 10 through the lens unit 200 as described above. The light L2 entering the imaging device 10 (e.g., through the lens unit 200) may travel sequentially to the light splitting unit 310, the light amount adjusting unit 410, and the sensing unit 510. The light splitting unit 310, the light amount adjusting unit 410 and the sensing unit 510 may be sequentially arranged along each of the first through third optical paths PA1 through PA3. The light reaching the sensing unit 510 may be measured by sensors in the sensing unit 510. The light splitting unit 310, the light amount adjusting unit 410, and the sensing unit 510 will now be described in more detail.

Figure 3:
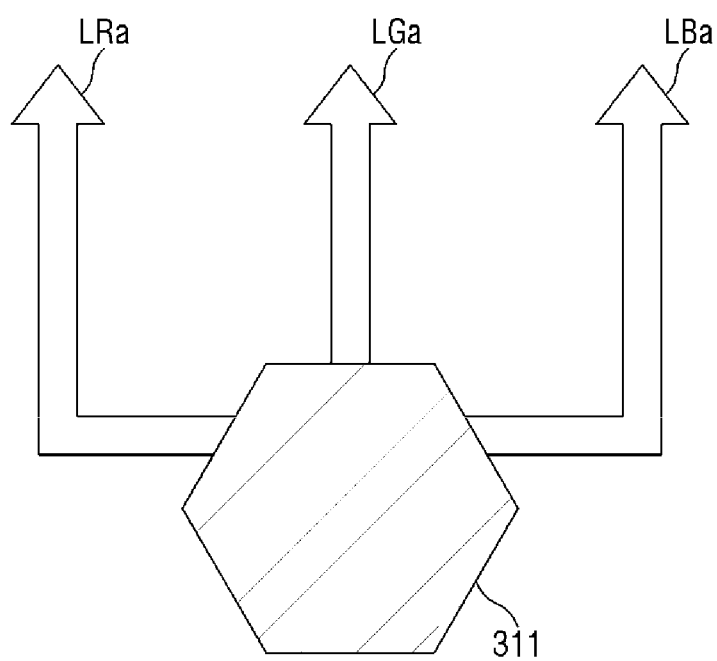
FIG. 3 is a schematic view of a light splitting unit according to an embodiment.

FIG. 3 is a schematic view of a light splitting unit 310 according to an embodiment. In FIG. 3, light entering the imaging device 10 is split into the first beam LRa, the second beam LGa, and the third beam Lba, all having the same (e.g., equal) amount of light.

Each arrow illustrated in the drawings (e.g., FIG. 3) indicates a beam traveling along an optical path, and the thickness of each arrow indicates the amount of light. That is, as illustrated in the drawing, the thicknesses of arrows indicating the beams LRa, LGa and LBa are the same, and the beams LRa, LGa and LBa have the same amount of light.

Referring to FIGS. 1 and 3, the light splitting unit 310 may be disposed inside the imaging device 10. A light splitting module 311 may receive the light L2 incident through the lens unit 200. The light splitting unit 310 may be an element that the light L2 incident into the imaging device 10 first reaches. The light splitting unit 310 may include the light splitting module 311. The light splitting module 311 may be a beam splitter and may split incident light into a plurality of beams.

For example, the light splitting module 311 may split the incident light L2 into the first beam LRa, the second beam LGa, and the third beam Lba, each having the same amount of light. The light splitting module 311 may split incident light into a beam of a first color, a beam of a second color, and a beam of a third color according to a wavelength band. The beam of the first color may correspond to the first beam LRa, the beam of the second color may correspond to the second beam LGa, and the beam of the third color may correspond to the third beam LBa.

In an embodiment, the light splitting module 311 may be a prism. The prism can refract light and disperse incident light according to the wavelength of the light by having two or more optical planes that are not parallel to each other. The prism may be in the shape of a triangular prism. However, the shape of the prism is not limited to the triangular prism and may also be a polygonal prism, a polygonal pyramid, a cone, and/or a sphere. The prism may include glass, crystal and/or rock salt. In an embodiment, the light splitting module 311 may include a transparent laminate. For example, the light splitting module 311 may include a dichroic mirror. The dichroic mirror is a reflector in which thin layers having different refractive indices are laminated (e.g., coated). The dichroic mirror may have the property of reflecting light of a certain color and transmitting light of other colors.

The shape and material of the light splitting module 311 are not limited as long as the light splitting module 311 can split incident light into beams having different wavelengths. The first beam LRa, the second beam LGa, and the third beam LBa transmitted through the light splitting module 311 may have the same amount of light.

The first beam LRa, the second beam LGa, and the third beam LBa may be beams of different colors. The first beam LRa may be a beam of the first color, the second beam LGa may be a beam of the second color, and the third beam LBa may be a beam of the third color. The beams of the first color, the second color and the third color refer to beams whose peak wavelengths are located within a first wavelength band, a second wavelength band and a third wavelength band, respectively. The beam of the first color may have the first wavelength band. The first wavelength band may have a central wavelength within the range of about 600 nm to about 670 nm. Accordingly, the beam of the first color may be a red beam. The beam of the second color may have the second wavelength band. The second wavelength band may have a central wavelength within the range of about 500 nm to about 570 nm. Accordingly, the beam of the second color may be a green beam. The beam of the third color may have the third wavelength band. The third wavelength band may have a central wavelength within the range of about 420 nm to about 480 nm. Accordingly, the beam of the third color may be a blue beam. A case where the first color is red, the second color is green, and the third color is blue will be described below. However, the first color, the second color and the third color are not limited to red, green and blue and may be of various suitable colors. That is, the central wavelengths of the first wavelength band, the second wavelength band and the third wavelength band are not limited to those described above and may be of various suitable central wavelengths.

As described above, the light splitting unit 310 may split light into the first beam LRa, the second beam LGa and the third beam LBa. However, the number of beams into which light is split is not limited thereto. For example, the light splitting unit 310 may split light into two beams or four beams according to the wavelength of the light. For example, when the light splitting unit 310 splits light into two beams according to a wavelength band, one beam may contain a beam of the first color and a beam of the second color, and the other beam may contain a beam of the third color. That is, one beam may be a yellow beam which is a mixture of the beam of the first color and the beam of the second color, and the other beam may be a blue beam which is the beam of the third color.

The first beam LRa, the second beam LGa and the third beam LBa output from the light splitting unit 310 may be transmitted to the light amount adjusting unit 410. The light amount (i.e., amount of light) of each of the first beam LRa, the second beam LGa and the third beam LBa may be adjusted as the first beam LRa, the second beam LGa and the third beam LBa pass through the light amount adjusting unit 410. The light amount adjusting unit 410 for adjusting the light amount of each beam transmitted through the light splitting unit 310 will now be described in more detail with reference to FIG. 4.

Figure 4:
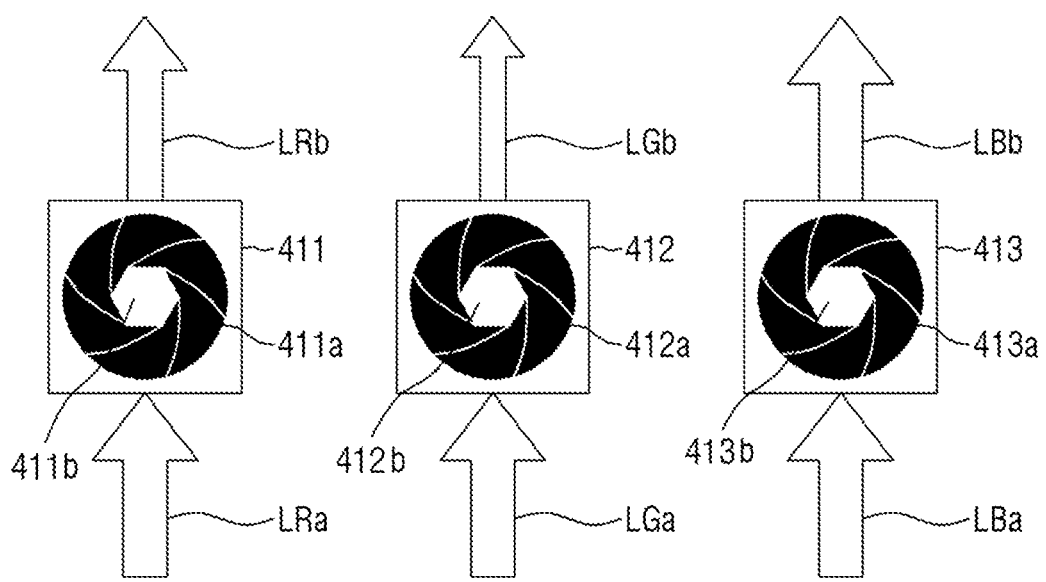
FIG. 4 is a schematic view of a light amount adjusting unit according to an embodiment.

FIG. 4 is a schematic view of a light amount adjusting unit 410 according to an embodiment.

Referring to FIGS. 1 and 4, the light amount adjusting unit 410 may include a first adjustment module 411, a second adjustment module 412, and a third adjustment module 413. The first beam LRa, the second beam LGa and the third beam LBa transmitted through the light splitting unit 310 may be incident on the first adjustment module 411, the second adjustment module 412, and the third adjustment module 413, respectively. The first beam LRa may be incident on the first adjustment module 411. The second beam LGa may be incident on the second adjustment module 412. The third beam LBa may be incident on the third adjustment module 413.

The first beam LRa adjusted by the first adjustment module 411 as it passes through the first adjustment module 411 may be the first adjusted beam LRb. The second beam LGa adjusted by the second adjustment module 412 as it passes through the second adjustment module 412 may be the second adjusted beam LGb. The third beam LBa adjusted by the third adjustment module 413 as it passes through the third adjustment module 413 may be the third adjusted beam LBb. As illustrated in the drawings, the light amount adjusting unit 410 may adjust the light amounts of the first beam LRa, the second beam LGa and the third beam LBa such that the magnitude of the light amount (i.e., amount of light) is greater (e.g., decreases) in the order of the third adjusted beam LBb, the first adjusted beam LRb, and the second adjusted beam LGb. The magnitude of the light amount of the third adjusted beam LBb may be substantially equal to the magnitude of the light amount of the third beam LBa. However, the magnitude of the light amount of the first adjusted beam LRb and the magnitude of the light amount of the second adjusted beam LBb may be smaller than the magnitude of the light amount of the first beam LRa and the magnitude of the light amount of the second beam Lba, respectively.

Each of the first adjustment module 411, the second adjustment module 412, and the third adjustment module 413 of the light amount adjusting unit 410 may include a light amount adjuster. For example, the light amount adjuster may be an aperture. A case where each of the first adjustment module 411, the second adjustment module 412, and the third adjustment module 413 of the light amount adjusting unit 410 includes an aperture as the light amount adjuster will be described below. Although not illustrated in the drawings, each of the first adjustment module 411, the second adjustment module 412, and the third adjustment module 413 may further include a lens for effectively receiving the beam LRa, LGa or LBa.

Each of the first adjustment module 411, the second adjustment module 412 and the third adjustment module 413 may include an individually adjustable aperture (411a, 412a or 413a). The aperture is a disk-shaped device that adjusts the amount of light by adjusting the size of an area 411b, 412b or 413b through which light is transmitted. However, the present disclosure is not limited to the aperture as long as the amount of light can be adjusted, and the form of the aperture is not limited to that illustrated in the drawings. A case where the amount of light is adjusted utilizing the aperture (411a, 412a or 413a) will be described below.

The light amount adjusting unit 410 adjusts the amount of light passing through the light amount adjusting unit 410 by opening or closing an aperture in each of the first adjustment module 411, the second adjustment module 412 and the third adjustment module 413. The aperture can be fully (e.g., completely) closed or opened. When the aperture is fully (e.g., completely) closed, light cannot be transmitted. When the aperture is fully opened, all of the light incident on the light amount adjusting unit 410 can be transmitted. That is, by adjusting the degree of opening of the aperture, it is possible to adjust the area 411b, 412b or 413b through which light incident on the light amount adjusting unit 410 can pass, thereby adjusting the amount of light. The first adjustment module 411, the second adjustment module 412 and the third adjustment module 413 may include a first aperture 411a, a second aperture 412a and a third aperture 413a, respectively. The light amounts of the beams LRa, LGa and LBa incident on the first adjustment module 411, the second adjustment module 412 and the third adjustment module 413 may all be equal to each other. However, the light amounts of the adjusted beams LRb, LGb and LBb output from the first adjustment module 411, the second adjustment module 412 and the third adjustment module 413 may be different from each other. That is, the first aperture 411a, the second aperture 412a, and the third aperture 413a may be opened to different degrees.

The degree of opening of each aperture may be reduced in the order of the third aperture 413a, the first aperture 411a, and the second aperture 412a. Of the first aperture 411a, the second aperture 412a and the third aperture 413a, the third aperture 413a may transmit a largest amount of light, and the second aperture 412a may transmit a smallest amount of light. That is, the transmissive area 413b of the third aperture 413a may be the widest (e.g., largest), and the transmissive area 412b of the second aperture 412a may be the narrowest (e.g., smallest).

The third aperture 413a may be opened to the maximum such that the amount of light incident on the third adjustment module 413 and the amount of light output from the third adjustment module 413 are substantially the same (i.e., equal to each other). The first aperture 411a may be opened to a lesser degree than the third aperture 413a. The second aperture 412a may be opened to a lesser degree than the first aperture 411a. In an embodiment, the first aperture 411a and the third aperture 413a may be opened to the same degree, and the second aperture 412a may be opened to a lesser degree than each of the first aperture 411a and the third aperture 413a.

Light transmitted through the first adjustment module 411 may be red light, light transmitted through the second adjustment module 412 may be green light, and light transmitted through the third adjustment module 411 may be blue light. That is, of the red light, the green light, and the blue light transmitted through the light amount adjusting unit 410, the amount of the blue light may be the largest, and the amount of the green light may be the smallest.

As described above, the light amount adjusting unit 410 may include all of the first adjustment module 411, the second adjustment module 412, and the third adjustment module 413. In an embodiment, however, the light amount adjusting unit 410 may not include at least one of the first adjustment module 411, the second adjustment module 412, and the third adjustment module 413. For example, the light amount adjusting unit 410 may not include the third adjustment module 413. Alternatively, the light amount adjusting module 411 may not include the first adjustment module 411 and the third adjustment module 413 and may include only the second adjustment module 412 to adjust the light amount of the second beam LGa incident on the light amount adjusting module 411.

The first adjusted beam LRb, the second adjusted beam LGb, and the third adjusted beam LBb transmitted through the light amount adjusting unit 410 are incident on the sensing unit 510. The sensing unit 510 may generate a color signal (SR, SG or SB) according to the value of incident light. The color signal (SR, SG or SB) may be a signal containing a red (R), green (G) or blue (B) value of the light. Sensing modules included in the sensing unit 510, a filter and an image sensor included in each of the sensing modules will now be described with reference to FIGS. 5, 6, and 7.

Figure 5:
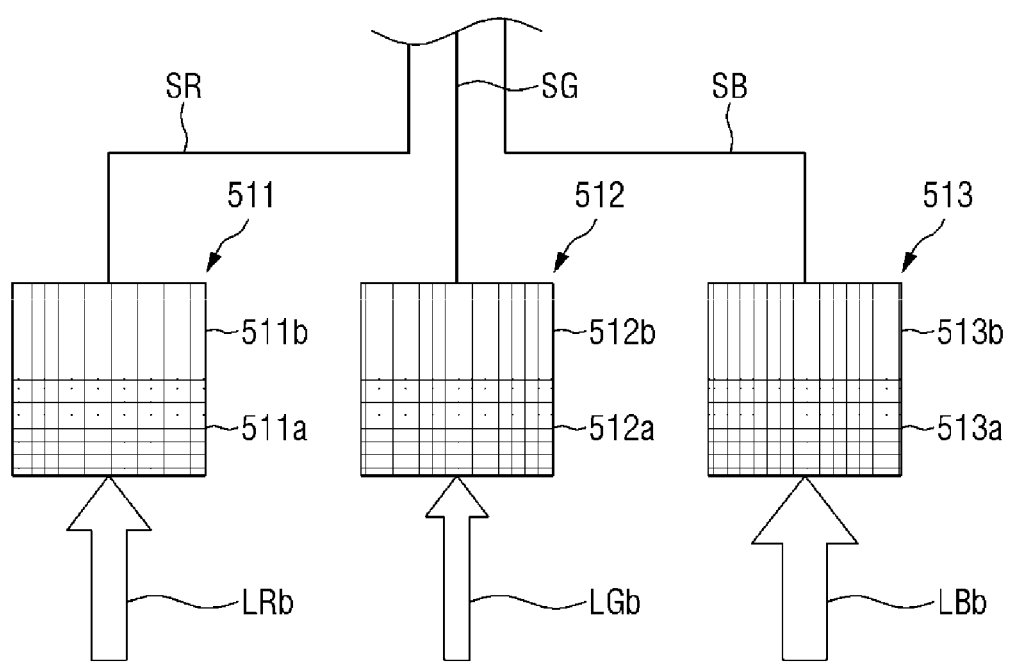
FIG. 5 is a schematic view of a sensing unit according to an embodiment.
Figure 6:
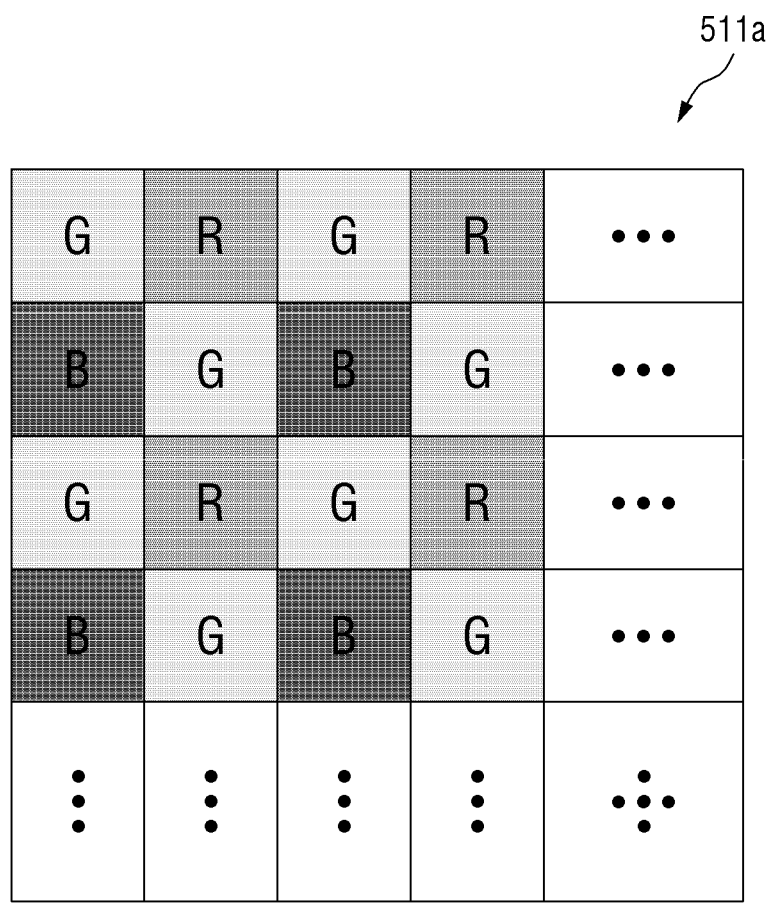
FIG. 6 is a plan view of a filter according to an embodiment.
Figure 7:
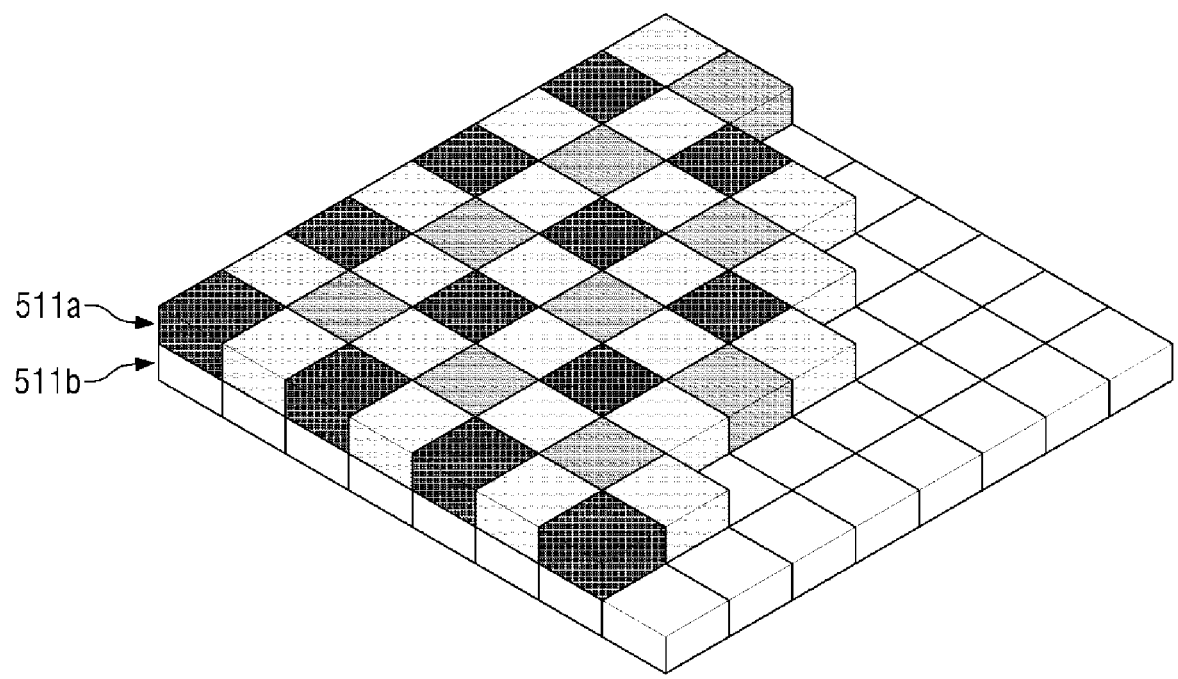
FIG. 7 is a perspective view of the filter and an image sensor according to an embodiment.

FIG. 5 is a schematic view of a sensing unit 510 according to an embodiment. FIG. 6 is a plan view of a filter 511a according to an embodiment. FIG. 7 is a perspective view of the filter 511a and an image sensor 511b according to an embodiment.

Referring to FIGS. 1 and 5, the sensing unit 510 may include a first sensing module 511, a second sensing module 512, and a third sensing module 513. Each of the first through third sensing modules 511 through 513 may further include a condensing lens (e.g., condenser) such as a microlens in order to enhance light condensing (e.g., concentrating or focusing) efficiency. The first adjusted beam LRb, the second adjusted beam LGb and the third adjusted beam LBb whose light amounts have been adjusted by the light amount adjusting unit 410 may be incident on the first sensing module 511, the second sensing module 512 and the third sensing module 513 of the sensing unit 510, respectively. The incident area of the third adjusted beam LBb incident on the third sensing module 513 may be the widest (e.g., largest). The incident area of the first adjusted beam LRb may be the next widest (e.g., second largest). The incident area of the second adjusted beam LGb incident on the second sensing module 512 may be the narrowest (e.g., smallest). As described above, the first adjusted beam LRb transmitted through the first adjustment module 411 may be a red beam, the second adjusted beam LGb transmitted through the second adjustment module 412 may be a green beam, and the third adjusted beam LBb transmitted through the third adjustment module 413 may be a blue beam. The first sensing module 511, the second sensing module 512, and the third sensing module 513 may receive beams corresponding to red, green and blue, and measure the magnitudes of the incident beams, respectively. That is, the first sensing module 511 may be a red light sensor, the second sensing module 512 may be a green light sensor, and the third sensing module 513 may be a blue light sensor.

The first sensing module 511 may include the first filter 511a and the first image sensor 511b. The second sensing module 512 may include a second filter 512a and a second image sensor 512b. The third sensing module 513 may include a third filter 513a and a third image sensor 513b. The first through third sensing modules 511 through 513 will now be described utilizing the first sensing module 511 as an example. The operations of the second sensing module 512 and the third sensing module 513 may be the same as or similar to that of the first sensing module 511.

The first filter 511a may be a filter including a plurality of RGB color filters. The first image sensor 511b may be disposed to correspond to the color filters of the first filter 511a. The arrangement and structure of the first filter 511a and the first image sensor 511b will now be described in more detail with reference to FIGS. 6 and 7.

FIG. 6 illustrates the first filter 511a in which a plurality of RGB color filters are arranged in a lattice form. Referring to FIG. 6, the first filter 511a may be a Bayer filter including a Bayer pattern. The Bayer pattern may be a pattern in which R, B and G patterns are arranged in a lattice structure. For example, a pattern of GRGR may be repeated in each odd row of the Bayer pattern, and a pattern of BGBG may be repeated in each even row of the Bayer pattern. The Bayer filter is a filter in which RGB color filters are respectively arranged in pixels in a lattice structure, like the Bayer pattern described above. Each R color filter of the Bayer filter may be an optical filter that transmits red light, each G color filter may be an optical filter that transmits green light, and each B color filter may be an optical filter that transmits blue light. Each color filter may absorb light other than the color that it transmits. Like the first filter 511a, the second filter 512a and the third filter 513a may also be Bayer filters.

In an embodiment, the first filter 511a, the second filter 512a, and the third filter 513a may be an X filter, a Y filter, and a Z filter corresponding to an XYZ filter. The use of the XYZ filter may increase the imaging time, but reduce the noise of a measured value.

FIG. 7 illustrates a part of the first filter 511a and the first image sensor 511b disposed on the first filter 511a. The first image sensor 511b may be disposed to correspond to the RGB color filters of the first filter 511a. That is, the first image sensor 511b may be a set of a plurality of sensors corresponding to the color filters, respectively. The first image sensor 511b may be a sensor for measuring red light transmitted through the first filter 511a. The first image sensor 511b disposed to overlap the R color filters may measure red light. The first image sensor 511b may be monochrome pixels that sense only the brightness of light.

For example, the first image sensor 511b may be a charge coupled device (CCD) image sensor. The CCD image sensor may be a device that transmits a signal utilizing a potential well formed on the semiconductor surface by charge coupling. That is, the CCD image sensor may include photosensitive pixels that convert optical signals into charge signals. The CCD imaging device may be a surface light source imaging device in which the photosensitive pixels are arranged two-dimensionally. In an embodiment, the first image sensor 511b may be a complementary metal oxide semiconductor (CMOS) image sensor.

The first image sensor 511b may be disposed to correspond to all color filters as illustrated in the drawing. However, the present disclosure is not limited to this case, and the first image sensor 511b may also be disposed to correspond to only the R color filters of the first filter 511a.

Referring again to FIGS. 1 and 5, light incident on the first sensing module 511 may be the first adjusted beam LRb of the first color. The first sensing module 511 may sense the brightness of red light transmitted through the first filter 511a by utilizing the first image sensor 511b and measure the red light distinguished from light of other colors. The first image sensor 511b may generate a first color signal SR by measuring the brightness of the incident first adjusted beam LRb. The first color signal SR may be transmitted to the signal processing unit 600 through a circuit.

The second sensing module 512 and the third sensing module 513 may operate in the same manner as the first sensing module 511 described above. The second sensing module 512 may be a sensor for measuring green light. Light incident on the second sensing module 512 may be the second adjusted beam LGb. The second adjusted beam LGb may pass through the G color filters of the second filter 512a. After passing through the second filter 512a, the second adjusted beam LGb may be incident on the second image sensor 512b. The second image sensor 512b may generate a second signal SG by measuring the brightness of the incident second adjusted beam LGb. The second color signal SG may be transmitted to the signal processing unit 600 through the circuit. The third sensing module 513 may be a sensor for measuring blue light. Light incident on the third sensing module 513 may be the third adjusted beam LBb. The third adjusted beam LBb may pass through the B color filters of the third filter 513a. After passing through the third filter 513a, the third adjusted beam LBb may be incident on the third image sensor 513b. The third image sensor 513b may generate a third color signal SB by measuring the brightness of the incident third adjusted beam LBb. The third color signal SB may be transmitted to the signal processing unit 600 through the circuit. The first color signal SR may be a red color signal, the second color signal SG may be a green color signal, and the third color signal SB may be a blue color signal.

The first color signal SR, the second color signal SG and the third color signal SB generated by the first sensing module 511, the second sensing module 512 and the third sensing module 513 may be transmitted to the signal processing unit 600 through the circuit inside the imaging device 10.

Referring again to FIG. 1, the signal processing unit 600 may receive the first color signal SR, the second color signal SG, and the third color signal SB from the sensing unit 510.

The signal processing unit 600 may form a two-dimensional (2D) map of RGB color values based on the first color signal SR, the second color signal SG and the third color signal SB. That is, RGB values corresponding to the pixels PX included in the display panel 120 may be obtained. In addition, the signal processing unit 600 may convert the RGB values into XYZ tristimulus values based on the 2D map of the RGB color values. That is, the signal processing unit 600 may obtain a 2D map corresponding to the display panel 120 and including respective RGB values and tristimulus values of the pixels PX. Therefore, the signal processing unit 600 can extract defect information by applying a different algorithm according to the type of defect of the display panel 120.

Figure 8:
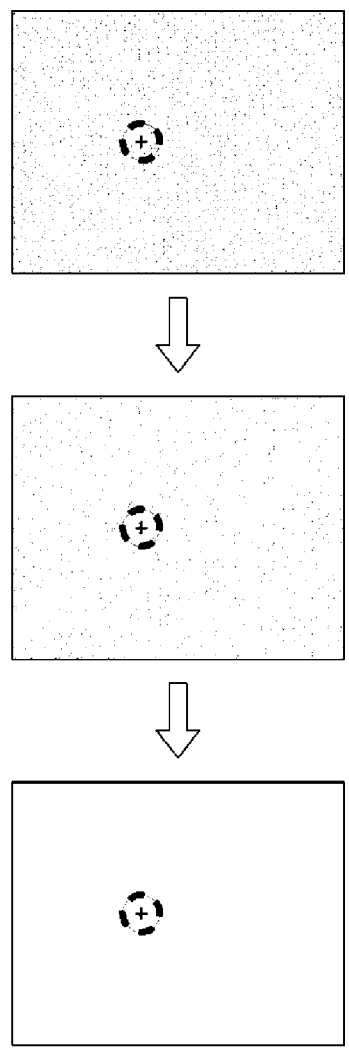
FIG. 8 compares the degrees of noise generation when display panels are photographed by the display panel inspection equipment.

FIG. 8 compares the degrees of noise generation when display panels are photographed by the display panel inspection equipment 1. In the drawing, a photographed display panel on the rightmost side shows the most noise, and a photographed display panel on the leftmost side shows the least noise.

There may be a difference in the degree of noise generation according to the amount of light for each color during display panel photographing. In the case of an organic light emitting display, blue light may be the darkest, and green light may be the brightest even though the red light, the green light, and the blue light have the same light amount.

When a display device is measured utilizing the imaging device 10 including the Bayer filter described above, RGB values can be measured at a time through one photographing operation. Because only one photographing operation is performed, the exposure time for light of each color may be the same during measurement. That is, with only one photographing operation, a sufficient amount of light for measurement can be obtained for red light and green light, which are brighter than blue light. However, because the blue light is darker than the red light and the green light, a sufficient amount of light for the measurement of the blue light may not be obtained only with the same exposure time as the exposure times for the red light and the green light. If the amount of light for the measurement of the blue light is insufficient, the rate of noise generation for the blue light may be relatively high. The generation of noise for the blue light can be reduced by performing a photographing operation several times, not just once, and then combining images obtained as a result of the photographing operation. However, the method of performing a photographing operation several times and then combining images obtained as a result of the photographing operation can increase the measurement time.

Therefore, the display panel inspection equipment 1 including the light splitting unit 310 and the light amount adjusting unit 410 as illustrated in FIG. 1 may reduce noise generation by splitting light according to color and adjusting the amount of light of each color separately. In particular, if the magnitude of the amount of light is adjusted to be greater (e.g., to decrease) in the order of blue, red and green, that is, in the order of darkest to brightest measured color, noise generation can be effectively reduced even if the photographing operation is not performed several times.

Hereinafter, display panel inspection equipment according to other embodiments will be described. In the following embodiments, elements identical to those of the above-described embodiment will be indicated by the same reference numerals, and a description of the elements will be omitted or given briefly. The following embodiments will be described, focusing mainly on differences from the above-described embodiment.

Figure 9:
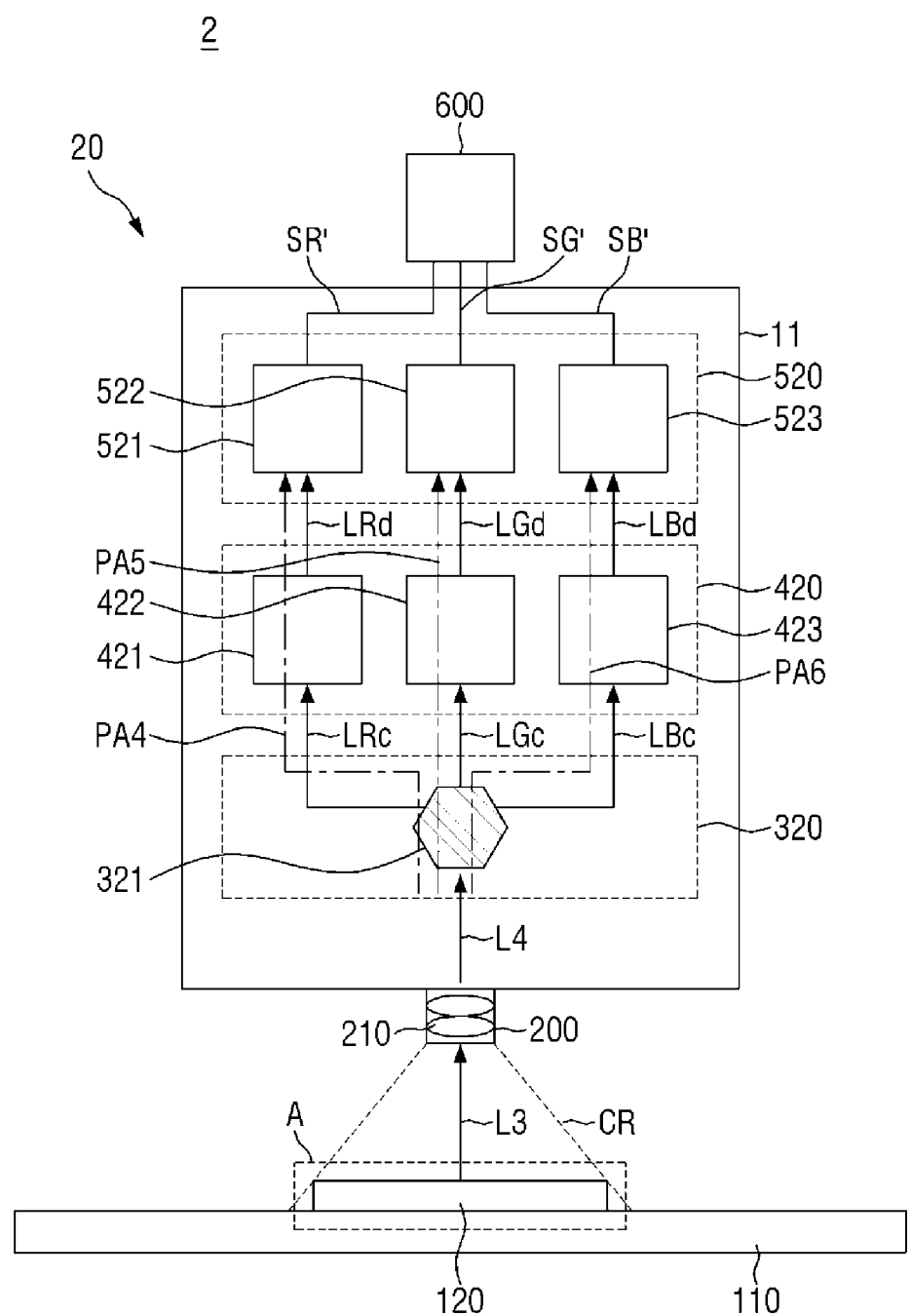
FIG. 9 is a schematic view of display panel inspection equipment according to an embodiment.

An embodiment illustrated in FIG. 9 is different from the embodiment illustrated in FIG. 1 in that a light splitting unit performs light splitting and primary light amount adjustment.

FIG. 9 is a schematic view of display panel inspection equipment 2 according to an embodiment. Referring to FIG. 9, the display panel inspection equipment 2 includes a case 11, a lens unit 200, a light splitting unit 320, a light amount adjusting unit 420, a sensing unit 520, and a signal processing unit 600. Inside the case 11, optical paths PA4, PA5 and PA6 along which light L3 emitted from an object to be inspected can travel may be formed.

Light L4 incident through the lens unit 200 enters the light splitting unit 320. The light splitting unit 320 may include a light splitting module 321 to split light incident on the light splitting unit 320 into a fourth beam LRc, a fifth beam LGc, and a sixth beam LBc. Each of the fourth through sixth beams LRc through LBc may correspond to a respective wavelength band.

The light splitting unit 320 may split the amount of the incident light L4 differentially at the same time as splitting the incident light L4 according to a wavelength band. That is, the light amounts of the fourth beam LRc, the fifth beam LGc, and the sixth beam LBc may be different from each other. The amount of light may be primarily adjusted by the light splitting unit 320.

The fourth beam LRc, the fifth beam LGc and the sixth beam LBc transmitted through the light splitting unit 320 are incident on a fourth adjustment module 421, a fifth adjustment module 422 and a sixth adjustment module 423 of the light amount adjusting unit 420, respectively. Each of the fourth adjustment module 421, the fifth adjustment module 422, and the sixth adjustment module 423 may adjust the amount of incident light. The amount of light may be primarily adjusted by the light splitting unit 320, and the magnitude of the amount of light may be more finely adjusted by the light amount adjusting unit 420.

A fourth adjusted beam LRd, a fifth adjusted beam LGd and a sixth adjusted beam LBd transmitted through the light amount adjusting unit 420 are incident on a fourth sensing module 521, a fifth sensing module 522 and a sixth sensing module 523 of the sensing unit 520, respectively. The fourth sensing module 521, the fifth sensing module 522 and the sixth sensing module 523 generate a fourth color signal SR', a fifth color signal SG' and a sixth color signal SB' by measuring the fourth adjusted beam LRd, the fifth adjusted beam LGd and the sixth adjusted beam LBd. The sensing unit 520 transmits the fourth color signal SR', the fifth color signal SG' and the sixth color signal SB' to the signal processing unit 600. The signal processing unit 600 may form a 2D map of RGB color values based on the color signals SR', SG' and SB' received from the sensing unit 520.

That is, compared with the embodiment illustrated in FIG. 1, in the embodiment illustrated in FIG. 9, the amount of light is split differentially by the light splitting unit 320 and then more finely adjusted by the light amount adjusting unit 420. Therefore, the noise generation rate can be further reduced. Accordingly, the color signals SR', SG' and SB' of FIG. 9 may contain less noise than the color signals SR, SG and SB of FIG. 1. The configuration and operation of the light splitting unit 320 and the light amount adjusting unit 420 will now be described in more detail with reference to FIGS. 10 and 11.

Figure 10:
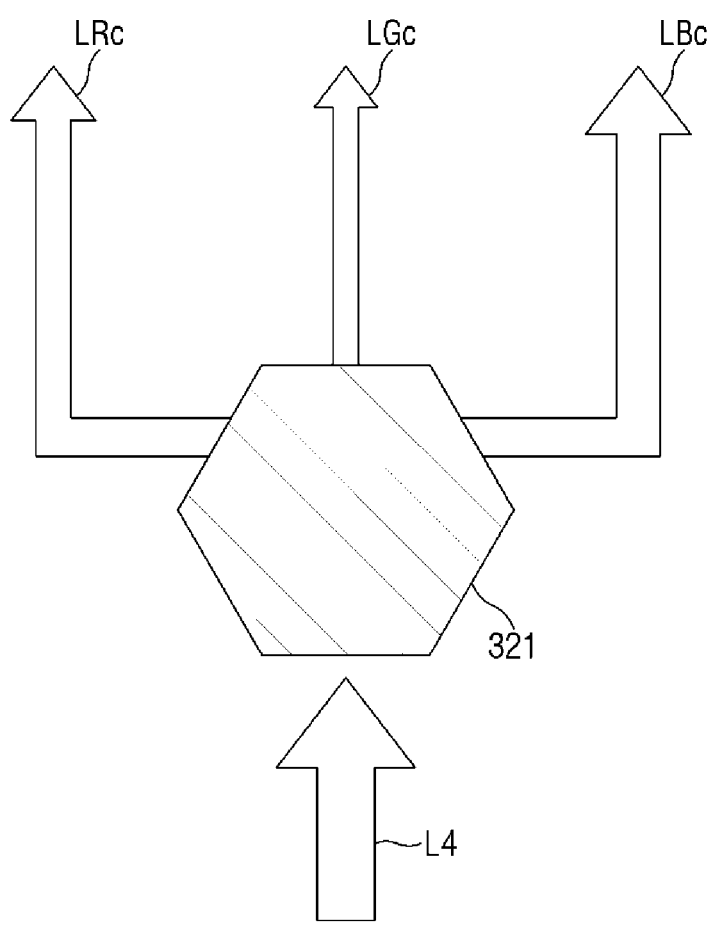
FIG. 10 is a schematic view of a light splitting unit according to an embodiment.

FIG. 10 is a schematic view of a light splitting unit 320 according to an embodiment. In FIG. 10, the incident light L4 is split into the beams LRc, LGc, and LBc having different colors and light amounts as it passes through the light splitting unit 320. Also, in FIG. 10, the light amount of the sixth beam LBc is the largest, and the light amount of the fifth beam LGc is the smallest.

Referring to FIGS. 9 and 10, the light splitting unit 320 may include the light splitting module 321. The light splitting module 321 may receive the light L4 incident through the lens unit 200. The light splitting module 321 may split the received light L4 into a plurality of beams based on wavelength bands. That is, the light splitting module 321 may split the light L4 according to the color of the light L4. The fourth beam LRc may be a red beam, the fifth beam LGc may be a green beam, and the sixth beam LBc may be a blue beam. However, the number of beams into which light is split and the colors of the beams are not limited, and light can be split into an appropriate number of beams and colors as needed.

The light splitting module 321 may split the amount of the incident light L4 such that the fourth beam LRc, the fifth beam LGc and the sixth beam LBc have different amounts of light, at the same time as splitting the light L4 into the fourth beam LRc, the fifth beam LGc and the sixth beam LBc according to the wavelength bands of the incident light L4. The light splitting module 321 may split and adjust the amount of the light L4 such that the amount of light is greater (e.g., decreases) in the order of the sixth beam LBc, the fourth beam LRc, and the fifth beam LGc. That is, the light amount of the blue beam may be the largest, and the light amount of the green beam may be the smallest. In an embodiment, the light amount of the sixth beam LBc may be greater than the light amount of the fourth beam LRc and the light amount of the fifth beam LGc, and the light amount of the fourth beam LRc and the light amount of the fifth beam LGc may be the same. In this case, the light amount of the fifth beam LGc may be adjusted to be smaller than the light amount of the fourth beam LRc by the light amount adjusting unit 420.

Figure 11:
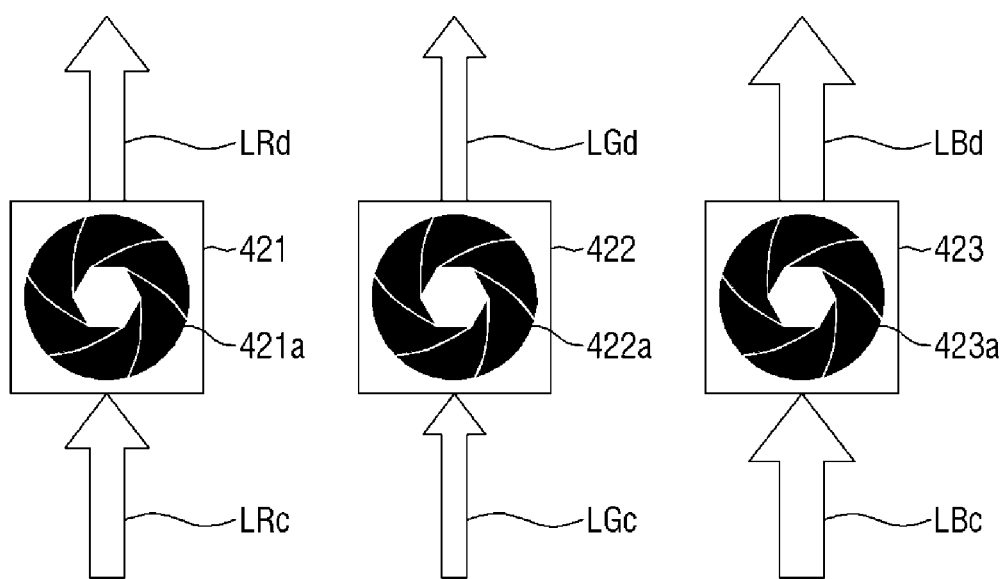
FIG. 11 is a schematic view of a light amount adjusting unit according to an embodiment.

FIG. 11 is a schematic view of a light amount adjusting unit 420 according to an embodiment. In FIG. 11, the fourth beam LRc, the fifth beam LGc and the sixth beam LBc whose light amounts have been adjusted by the light splitting unit 320 are incident on the fourth adjustment module 421, the fifth adjustment module 422 and the sixth adjustment module 423, respectively. In FIG. 11, the magnitude of the light amount of the sixth beam LBc is the largest, and the magnitude of the light amount of the fifth beam LGc is the smallest. Also, in FIG. 11, the magnitude of each of the beams LRc, LGc and LBc is not substantially (or greatly) different from the magnitude of each of the adjusted beams LRd, LGd and LBd output from the light amount adjusting unit 420.

Referring to FIGS. 9 and 11, the light amount adjusting unit 420 includes the fourth adjustment module 421, the fifth adjustment module 422, and the sixth adjustment module 423. The fourth adjustment module 421, the fifth adjustment module 422 and the sixth adjustment module 423 may include first, second and third apertures 421a, 422a and 423a, respectively.

Each of the fourth through sixth adjustment modules 421 through 423 may finely adjust the amount of light according to the degree of opening of the aperture 421a, 422a or 423a. The incident area of the sixth beam LBc incident on the sixth adjustment module 423 may be the widest (e.g., largest), and the incident area of the fourth beam LRc incident on the fourth adjustment module 421 may be the next widest (e.g., the second largest). The incident area of the fifth beam LGc incident on the fifth adjustment module 422 may be narrower (e.g., smaller) than those of the sixth adjustment module 423 and the fourth adjustment module 421. The light amount adjusting unit 420 may finely adjust the primarily adjusted light amounts of the fourth beam LRc, the fifth beam LGc and the sixth beam LBc. That is, the light amount adjusting unit 420 may perform fine adjustment to reduce the noise generation rate within the range in which the light amount of the sixth beam LBc is the largest and the light amount of the fifth beam LGc is the smallest. The resultant fourth adjusted beam LRd, fifth adjusted beam LGd and sixth adjusted beam LBd may be transmitted to the sensing unit 520 and measured by the sensing unit 520.

Therefore, the light L4 incident into the display panel inspection equipment 2 may be split according to a wavelength band by the light splitting unit 320, and the amount of the light may be differentially adjusted (primary adjustment) by the light splitting unit 320. After that, the amount of the light transmitted through the light splitting unit 320 may be finely adjusted (secondary adjustment) by the light amount adjusting unit 420, thereby minimizing or reducing the noise of the result value.

Figure 12:
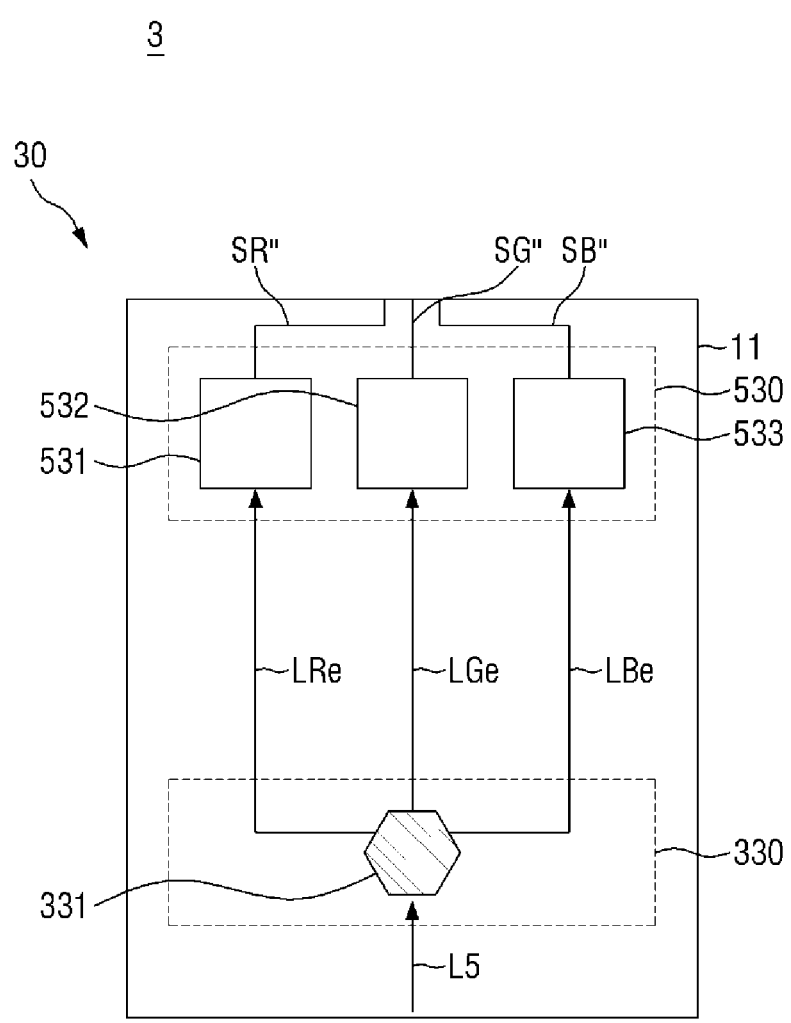
FIG. 12 is a partial schematic view of display panel inspection equipment according to an embodiment.

An embodiment illustrated in FIG. 12 is different from the embodiment illustrated in FIG. 9 in that a light amount adjusting unit is not provided. The current embodiment will now be described, focusing mainly on differences from the embodiment of FIG. 9.

FIG. 12 is a schematic view of a part of display panel inspection equipment 3 according to an embodiment. In FIG. 12, a light splitting unit 330 and a sensing unit 530 of the display panel inspection equipment 3 are illustrated.

Referring to FIG. 12, the display panel inspection equipment 3 includes the light splitting unit 330 and the sensing unit 530. A light splitting module 331 of the light splitting unit 330 splits incident light L5 into a seventh beam LRe, an eighth beam LGe and a ninth beam LBe at the same time as splitting the amount of the light L5 such that the seventh beam LRe, the eighth beam LGe and the ninth beam LBe have different amounts of light. The light splitting module 331 may split the amount of the light L5 such that the light amount of the ninth beam LBe is the largest. Alternatively, the light splitting module 331 may split the amount of the light L5 such that the magnitude of the light amount is greater (e.g., decreases) in the order of the ninth beam LBe, the seventh beam LRe and the eighth beam LGe.

The light splitting unit 330 may transmit the seventh beam LRe, the eighth beam LGe and the ninth beam LBe to the sensing unit 530. A seventh sensing module 531, an eighth sensing module 532 and a ninth sensing module 533 of the sensing unit 530 may respectively measure the received beams LRe, LGe and LBe, generate color signals SR", SG" and SB" and transmit the color signals SR", SG" and SB" to a signal processing unit.

Although the embodiment of FIG. 12 does not include a light amount adjusting unit ("420" in FIG. 9) for performing fine adjustment as in the embodiment of FIG. 9, it is possible to effectively reduce noise by adjusting the amount of light utilizing the light splitting unit 330.

Display panel inspection equipment according to an embodiment includes a light splitting unit and a light amount adjusting unit. Thus, the display panel inspection equipment can split light into RGB wavelength bands and adjust the amount of light to be greater (e.g., to decrease) in the order of blue light, green light and red light, thereby effectively reducing generation of noise.

Display panel inspection equipment according to an embodiment can effectively reduce display panel measurement time by including a Bayer filter.

The [device] and/or any other relevant devices or components according to embodiments of the present invention described herein may be implemented utilizing any suitable hardware, firmware (e.g. an application-specific integrated circuit), software, or a combination of software, firmware, and hardware. For example, the various components of the [device] may be formed on one integrated circuit (IC) chip or on separate IC chips. Further, the various components of the [device] may be implemented on a flexible printed circuit film, a tape carrier package (TCP), a printed circuit board (PCB), or formed on one substrate. Further, the various components of the [device] may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Further, the use of "may" when describing embodiments of the present invention refers to "one or more embodiments of the present invention."

However, the effects of the embodiments are not restricted to the ones set forth herein. The above and other effects of the embodiments will become more apparent to one of daily skill in the art to which the embodiments pertain by referencing the claims, and equivalents thereof.

In the above description, the present invention has been described based on the exemplary embodiments, but the exemplary embodiments are for illustrative purpose only, and do not limit the present invention. Those skilled in the art will appreciate that various modifications and applications, which are not exemplified in the above description, may be made without departing from the scope of the essential characteristic of the present exemplary embodiments. For example, each component described in detail in the exemplary embodiment can be modified and executed. Therefore, it should be construed that contents associated with the combination and modification are included in the scope of the present invention.

What is claimed is:
1. A display panel inspection equipment comprising:
a panel support configured to support a display panel; and
an imaging device facing the panel support, wherein the imaging device has an optical path and comprises:
a lens unit on a side of the optical path and configured to cause light to enter the imaging device;
a sensing unit on an other side of the optical path and comprising a Bayer filter;
a light splitting unit between the lens unit and the sensing unit, overlapping at least a part of the optical path, and configured to split the light entering the imaging device into a plurality of beams, and
a light amount adjusting unit between the light splitting unit and the sensing unit, wherein the plurality of beams comprise a beam of a first color and a beam of a second color, wherein the beam of the first color is a blue beam, and wherein the light amount adjusting unit is configured to adjust an amount of light of the beam of the second color to be smaller than an amount of light of the beam of the first color.

2. The equipment of claim 1, wherein the light splitting unit is configured to split the light into the plurality of beams, each having a same amount of light.

3. The equipment of claim 2, wherein the light splitting unit comprises a prism.

4. A display panel inspection equipment comprising:
a panel support configured to support a display panel; and
an imaging device facing the panel support,
wherein the imaging device has an optical path and comprises:
a lens unit on a side of the optical path and configured to cause light to enter the imaging device;
a sensing unit on an other side of the optical path and comprising a Bayer filter; and
a light splitting unit between the lens unit and the sensing unit, overlapping at least a part of the optical path, and configured to split the light entering the imaging device into a plurality of beams,
wherein the light splitting unit is configured to split the light into the plurality of beams, each having a same amount of light,
wherein the light splitting unit comprises a prism,
wherein the plurality of beams comprise a beam of a first color and a beam of a second color, wherein the beam of the first color is a blue beam,
wherein the imaging device further comprises a light amount adjusting unit between the light splitting unit and the sensing unit, overlapping at least a part of the optical path, and configured to adjust an amount of light of the beam of the first color and an amount of light of the beam of the second color to be different from each other, and
wherein the light amount adjusting unit is configured to adjust the amount of light of the beam of the second color to be smaller than the amount of light of the beam of the first color.

5. The equipment of claim 4, wherein the plurality of beams further comprise a beam of a third color, wherein the beam of the second color is a green beam, and the beam of the third color is a red beam.

6. The equipment of claim 5, wherein the light amount adjusting unit is configured to adjust the amount of light of the beam of the second color to be smaller than an amount of light of the beam of the third color.

7. The equipment of claim 6, wherein the light amount adjusting unit comprises a first aperture through which the beam of the first color passes, a second aperture through which the beam of the second color passes and a third aperture through which the beam of the third color passes, and
the light amount adjusting unit is configured to adjust a transmissive area of the second aperture to be smaller than that of the first aperture.

8. A display panel inspection equipment comprising:
a panel support configured to support a display panel; and
an imaging device facing the panel support,
wherein the imaging device comprises:
a lens unit configured to receive a first light emitted from the display panel and to transmit a second light into the imaging device;
a light splitting unit configured to receive the second light and to split the second light into a third light according to a wavelength band, wherein the third light comprises a beam of a first color, a beam of a second color and a beam of a third color;
a light amount adjusting unit configured to receive the third light and to transmit a fourth light by adjusting an amount of the third light such that an amount of light of the beam of the first color is the largest; and
a sensing unit comprising a Bayer filter and configured to receive the fourth light,
wherein the beam of the first color is a blue beam.

9. The equipment of claim 8, wherein the beam of the second color is a green beam, and the beam of the third color is a red beam.

10. The equipment of claim 9, wherein the light splitting unit is configured to split the second light into the third light such that the beam of the first color, the beam of the second color and the beam of the third color have the same amount of light.

11. The equipment of claim 10, wherein the light amount adjusting unit is configured to adjust an amount of light of the beam of the first color to be the largest and an amount of light of the beam of the second color to be the smallest.

* * * * *